(12) United States Patent
Sivanandan et al.

(10) Patent No.: US 11,088,362 B2
(45) Date of Patent: Aug. 10, 2021

(54) METHOD FOR REMOVING LITHIUM HYDRIDE FACETED DEFECTS FROM LITHIUM METAL FOIL

(71) Applicant: Robert Bosch GmbH, Stuttgart (DE)

(72) Inventors: Kulandaivelu Sivanandan, Fremont, CA (US); Albert Aumentado, San Pablo, CA (US); Hany Basam Eitouni, Oakland, CA (US)

(73) Assignee: Robert Bosch GmbH, Stuttgart (DE)

( * ) Notice: Subject to any disclaimer, the term of this patent is extended or adjusted under 35 U.S.C. 154(b) by 86 days.

(21) Appl. No.: 16/378,249

(22) Filed: Apr. 8, 2019

(65) Prior Publication Data
US 2020/0321606 A1    Oct. 8, 2020

(51) Int. Cl.
| | |
|---|---|
| *H01M 4/134* | (2010.01) |
| *H01M 4/04* | (2006.01) |
| *H01M 4/62* | (2006.01) |
| *H01M 10/0525* | (2010.01) |
| *H01M 10/0565* | (2010.01) |
| *H01M 4/131* | (2010.01) |
| *H01M 4/58* | (2010.01) |
| *H01M 4/02* | (2006.01) |

(52) U.S. Cl.
CPC ......... *H01M 4/134* (2013.01); *H01M 4/0452* (2013.01); *H01M 4/131* (2013.01); *H01M 4/5825* (2013.01); *H01M 4/621* (2013.01); *H01M 10/0525* (2013.01); *H01M 10/0565* (2013.01); *H01M 2004/027* (2013.01)

(58) Field of Classification Search
CPC .......... H01M 4/134; H01M 4/04; H01M 4/62; H01M 4/131; H01M 10/0525; H01M 10/0565
See application file for complete search history.

(56) References Cited

U.S. PATENT DOCUMENTS

| | | | | |
|---|---|---|---|---|
| 5,292,823 | A | * | 3/1994 | Pourahmady ............. C08F 8/26 525/331.5 |
| 2013/0224632 | A1 | * | 8/2013 | Roumi ................ H01M 4/5825 429/516 |
| 2018/0371632 | A1 | | 12/2018 | Bodoin et al. |
| 2019/0280292 | A1 | | 9/2019 | Westmore et al. |

OTHER PUBLICATIONS

Unpublished U.S. Appl. No. 16/294,896, filed Mar. 6, 2019.
Wikipedia article on Lithium triethylborohydride (https://en.wikipedia.org/wiki/Lithium_triethylborohydride). First posted on Sep. 18, 2007.
Li et al. "Solvent-Processed Metallic Lithium Microparticles for Lithium Metal Batters", ACS Applied Energy Materials, vol. 2, No. 3, Mar. 25, 2019, XP009522581, ISSN: 2574-0962, 6 pages.

* cited by examiner

*Primary Examiner* — Kenneth J Douyette
(74) *Attorney, Agent, or Firm* — Brooks Kushman P.C.

(57) ABSTRACT

In this disclosure, we describe a new chemical treatment that can be performed on lithium metal and lithium alloy surfaces to selectively remove LiH defects. This treatment utilizes an exclusive reaction between LiH and trialkyl borane to form lithium borohydride complexes, which can be easily washed away from surface using an inert organic solvent. This treatment can be useful for lithium metal and lithium alloy anodes for high energy batteries.

20 Claims, 2 Drawing Sheets

METHOD FOR REMOVING LITHIUM HYDRIDE FACETED DEFECTS FROM LITHIUM METAL FOIL

BACKGROUND OF THE INVENTION

Field of the Invention

This invention relates generally to lithium metal, and, more specifically, to lithium metal foils with very low surface defect density, which are especially useful as anodes in secondary battery cells.

In secondary lithium metal batteries, lithium metal ions leave the negative electrode (anode) and move toward the positive electrode (cathode) during discharge as they do in primary batteries. But, unlike primary batteries, in secondary batteries lithium metal ions move back to the negative electrode during charging. Secondary batteries are designed to undergo very many cycles of charging and discharging.

Lithium metal and lithium alloy foils can be used as anodes in such secondary batteries to achieve higher energy density than is possible with lithium ion secondary batteries that employ graphite anodes. Lithium foils that are obtained from commercial sources have been found to include lithium hydride (LiH) faceted defects both at the surface and within the interior of the foils. It has been found that such defects can lead to premature cell failure at the anode/separator interface.

LiH defects can be removed by melting and extruding lithium in the presence of gettering materials such as yttrium. However, after extrusion, the surfaces of the lithium metal inevitably are exposed to hydrogen, even in controlled environments, and new LiH defects can be formed easily.

It would be useful to find a way to treat Li metal and lithium alloy foils to remove LiH defects just prior to integrating such foils as anodes into secondary battery cells.

SUMMARY

In one embodiment of the invention, a method of removing lithium hydride defects from the surface of a lithium foil is provided. The method involves the steps of: placing a lithium foil in a solution of trialkyl borane and a solvent for 0.25-4 hours; removing the lithium foil from the solution; rinsing the lithium foil in a solvent. The trialkyl borane may have the following structure:

wherein each R is selected independently from the group consisting of alkyl groups, perfluoroalkyl groups, alkoxy groups, and perfluoro alkoxy groups. The alkyl groups may be any of methyl, ethyl, propyl, butyl, iso-propyl, tert-butyl, phenyl, cyclohexyl, allyl, or vinyl groups, or combinations thereof. The perfluoroalkyl groups may be any of $CF_3$, $CF_2CF_3$, or combinations thereof. The alkoxy groups may be any of methoxy, ethoxy, or isopropoxy groups, or combinations thereof. The perfluoro alkoxy groups are may be any of $CF_3O-$, $CF_2CF_3O-$, or combinations thereof. The solvent may be any of hexane, heptane, THF, or ether.

In another embodiment of the invention, a lithium foil that has a surface with no LiH defects is provided. The lithium foil has been treated using the method disclosed above, and all LiH defects has been removed from the foil surface.

In another embodiment of the invention, a battery cell is provided. The battery cell has a lithium foil anode; a cathode comprising cathode active material particles, an electronically-conductive additive, and a catholyte; a current collector adjacent to an outside surface of the cathode; and a separator region between the anode and the cathode, the separator region comprising a solid polymer electrolyte and a lithium salt; wherein the lithium foil anode has a surface adjacent to the separator region, and the surface contains no LiH defects.

The cathode active material may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, or combinations thereof. The solid polymer electrolyte may include any of polyethers, polyamines, polyimides, polyamides, poly alkyl carbonates, polynitriles, perfluoro polyethers, fluorocarbon polymers substituted with high dielectric constant groups such as nitriles, carbonates, sulfones, or combinations thereof.

In some arrangements, the solid polymer electrolyte is a block copolymer electrolyte. The block copolymer electrolyte may include a conductive block, and the conductive bock may include any of polyethers, polyamines, polyimides, polyamides, poly alkyl carbonates, polynitriles, perfluoro polyethers, fluorocarbon polymers substituted with high dielectric constant groups such as nitriles, carbonates, sulfones, or combinations thereof. The block copolymer electrolyte may include a structural block, and the structural bock includes any of polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly (cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, polyvinylidene fluoride, or combinations thereof.

BRIEF DESCRIPTION OF THE DRAWINGS

The foregoing aspects and others will be readily appreciated by the skilled artisan from the following description of illustrative embodiments when read in conjunction with the accompanying drawing.

DETAILED DESCRIPTION

The embodiment of the invention are illustrated in the context of lithium metal anodes in battery cells. The skilled artisan will readily appreciate, however, that the materials and methods disclosed herein will have application in a number of other contexts where purification of lithium metal is desirable, particularly where removal of surface defects is important.

These and other objects and advantages of the present invention will become more fully apparent from the following description taken in conjunction with the accompanying drawings.

Reference will now be made to the drawings wherein like numerals refer to like parts throughout.

All ranges disclosed herein are meant to include all ranges subsumed therein unless specifically stated otherwise. As used herein, "any range subsumed therein" means any range that is within the stated range.

In this disclosure, the terms "negative electrode" and "anode" are both used to describe a negative electrode. Likewise, the terms "positive electrode" and "cathode" are both used to describe a positive electrode.

The term "lithium foil" is used herein to include both lithium metal foils and lithium alloy foils.

The term "solid polymer electrolyte" is used herein to mean a polymer electrolyte that is solid at battery cell operating temperatures. Examples of useful battery cell operating temperatures include room temperature (25° C.), 40° C., and 80° C.

In this disclosure, ranges of values are given for many variables. It should be understood that the possible values for any variable also include any range subsumed within the given range.

The following construction is used throughout this disclosure: "each variable is chosen independently" from a list that is provided. An example of this usage can be found with reference to X groups in some of the inventive polymer structures in which there are many Xs. The example is, "each X may be chosen independently from hydrogen, fluorine, methyl, ethyl, isopropyl, and trifluoromethyl groups." This construction is used to mean that for a particular X in the structure, any of the groups in the list may be used. In choosing a group to use for another X in the structure, any of the groups in the list may be used with no regard to the choices that have been made for other X groups. Thus, the following arrangements are all possible: all the Xs may be the same, all the Xs may be different, or some Xs may be the same and some may be different.

All publications referred to herein are incorporated by reference in their entirety for all purposes as if fully set forth herein.

The aforementioned needs are satisfied by the embodiments of the present invention which describe a new chemical treatment that can be performed on lithium foils to selectively remove LiH defects. This treatment exploits the higher reactivity with borane of lithium hydride as compared to lithium metal to achieve this.

The Effect of Lithium Defects in a Lithium Secondary Battery

Figure 1:
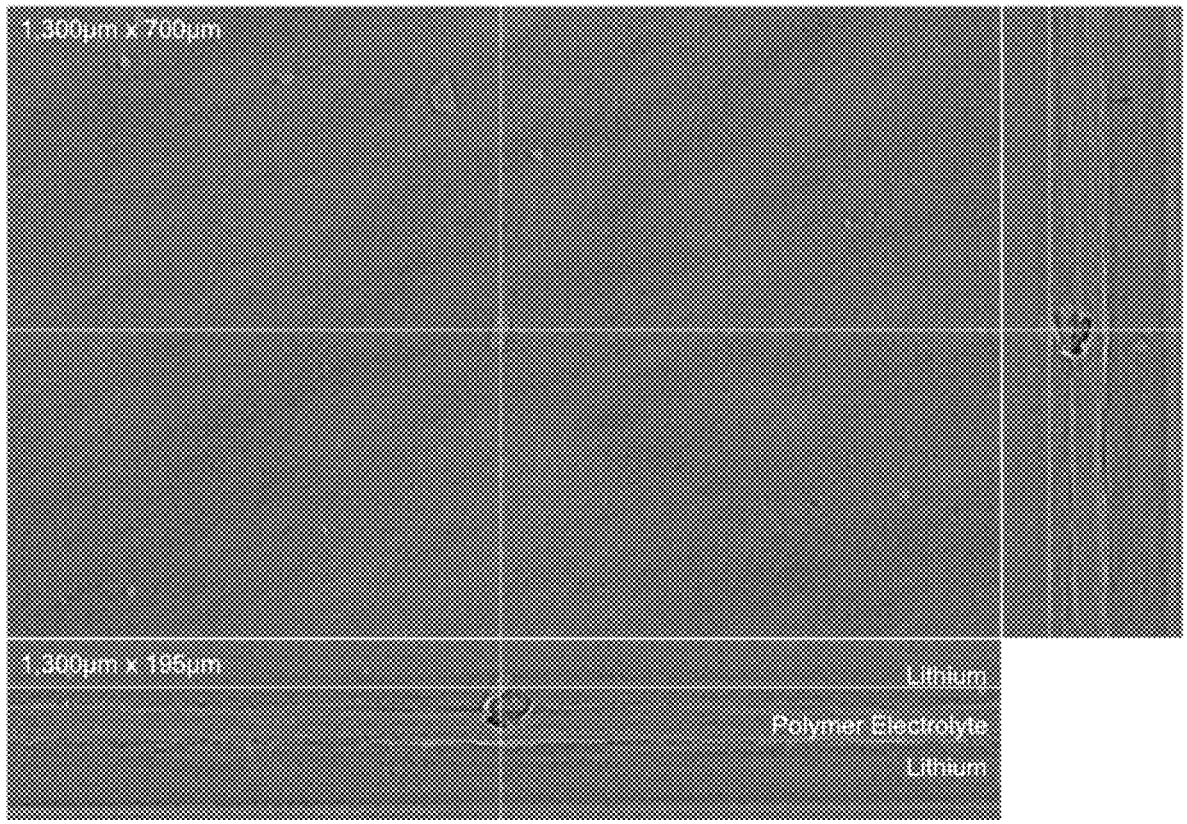
FIG. 1 shows x-ray tomograms of damage in a polymer electrolyte near a crystalline defect in a lithium metal foil.

A lithium metal symmetric cell was constructed with a 60 μm-thick, rolled lithium metal foils as anode and cathode and a polymer electrolyte as the separator. The cell was cycled at 100 μA/cm$^2$, with 7 μm of lithium transferred throughout per cycle. FIG. 1 shows orthogonal tomograms in the region of a crystalline defect in the lithium metal foil of the cell. The x-ray tomography was made using 23 keV x rays, a 5× objective, more than 19% transmission, 180° rotation, and a 100 mm scintillator to sample distance. The large image is a plan view of the lithium metal foil. The same voxel appears at intersection of white lines in each cross section. Thin white lines represent the planes for orthogonal images.

There is a disturbed region in the electrolyte adjacent to the defect in the lithium metal foil. Such disturbed regions are not observed elsewhere in the cell. As a cell continues to be cycled, the disturbed region in the electrolyte can grow and eventually can extend through the entire thickness of the electrolyte. Once the disturbed region reaches the opposite electrode (or more precisely, once numerous disturbances span the electrolyte), the cell has a short circuit pathway and may fail.

As a secondary lithium battery (with a lithium metal anode) cell cycles, lithium leaves the anode as the cell discharges and is electroplated back onto the anode as the cell charges. It has been shown that the morphology of such electroplated lithium is influenced greatly by the current density at the anode. Plated lithium metal is smoother when deposited at low current densities than at high current densities. It has been shown that as the limiting current density of an electrolyte, i.e., the current density at which the ion concentration near the electrode approaches zero, is reached and exceeded, the morphology of electroplated lithium changes drastically, becoming less dense and more uncontrolled. At this current density, the electrochemical plating rate of the ions is greater than that which can be supported by electrolyte ion transport properties, leading to salt depletion.) The mechanism for this uncontrolled plating is not well understood, but it could be that as salt concentration approaches zero, there is an overpotential to move charge across this zone that has little or no salt. This overpotential is manifested as a high local electric field, which can result in electrochemical degradation of the electrolyte in addition to the nonuniform plating. The electrolyte degradation may further influence the uncontrolled plating. It is expected that operating a lithium ion cell below the limiting current density will minimize the amount of uncontrolled lithium plating.

Defects that contain lithium hydride are less electronically conductive (more insulating) than lithium metal. When such defects or insulating regions are on or near the surface of a lithium metal anode, they affect the local current density distribution during lithium plating. Because lithium ions cannot plate onto the insulating regions, the current density in the electrolyte at those regions is zero. In general, the current density adjacent to such insulating regions may be higher than the average current density across the anode. In this way, although a cell may be operating below its limiting current density, there may be regions near such insulating defect regions in which the local current density exceeds the limiting current density. The larger the insulating regions, the larger the local current density adjacent to them. Factors that contribute to determining a largest acceptable defect size include average applied current density and transport properties of the electrolyte. It is advantageous if there is no local current density that exceeds the limiting current density for the cell. Thus, a largest acceptable insulating defect size, i.e., a largest size below which cell shorting is unlikely to occur as a cell cycles, can be determined.

Lithium metal foils and lithium alloy (i.e., Li—Mg, Li—Al, Li—Si, and Li—Na) foils purchased from more than four commercial sources were examined using x-ray tomography as described above. All contained LiH defects. The number of defects ranged from several hundred to more than 4000 per unit cubic millimeter. Further details about LiH defects in lithium foils can be found in U.S. patent application Ser. No. 16/294,896, filed Mar. 6, 2019, which is included by reference herein.

Methods for Removing LiH Defects

In some embodiments of the invention, lithium foils are treated with trialkyl boranes to dissolve LiH defects on the surfaces of the foils. LiH is a strong, hydride-based reducing agent that can react with trialkyl boranes to form borohydrides. The general structure of a trialkyl borane is shown below.

in which each R is chosen independently from a list that includes simple alkyl units (e.g., methyl, ethyl, propyl, butyl, iso-propyl, tert-butyl, phenyl, cyclohexyl, allyl, and vinyl); perfluoroalkyl groups (e.g., $CF_3$, $CF_2CF_3$); alkoxy groups (e.g., methoxy, ethoxy, and iso-propoxy); perfluoro alkoxy groupa (e.g., $CF_3O$— and $CF_2CF_3O$—); or combinations thereof.

The reactivity (with LiH) and solubility of the borane can be changed by changing the R group. For example, lithium tri-(tert-butyl) borohydride dissolves easily in non-polar solvents such as hexanes and ether due to the presence of the bulky tert-butyl hydrophobic groups. Thus, it is easy to remove such borohydrides by rinsing with an inert solvent (i.e., a solvent that does not react with the lithium foil) such as hexane after lithium foils have been reacted such borohydrides to remove LiH defects.

However, bulky groups will sterically hinder access to the boron (B) center and will lower its reactivity towards LiH.

Safety is also an important consideration when working with boranes as smaller boranes are highly flammable and explosive. Choosing higher molecular weight R will decrease volatility and increase safety.

Lithium triethylborohydride ($LiBH(Et)_3$) can be synthesized by reacting LiH and triethyl borane ($B(Et)_3$). This is a highly exothermic reaction, which indicates that formation of the borohydride complex is thermodynamically favored. As $LiBH(Et)_3$ is highly soluble in THF, the reaction turned from turbid to clear within minutes due to consumption of the insoluble LiH. The reaction can be expressed as:

$$LiH+B(Et)_3 \rightarrow Li\ BH(Et)_3$$

In one embodiment of the invention, a lithium metal foil known to contain less than 1% surface coverage of LiH, was treated with a $B(Et)_3$ solution (in THF). The lithium metal was intact even after 1 hour of exposure, indicating that the $B(Et)_3$ solution had little or no reaction with the Li metal while easily reacting with the LiH. This demonstrates that such an approach can be used to remove LiH defects without damaging Li metal foil.

In one embodiment of the invention, a method of removing lithium hydride defects from a lithium foil is disclosed. The method involves submerging the lithium foil in a solution of any of the trialkyl boranes described herein and a solvent for 0.25-4 hours. After removing the lithium foil from the solution, it is rinsed a solvent. Useful solvents will dissolve the trialkyl borane without reacting with the lithium metal or lithium alloy in the lithium foil. Examples of appropriate solvents include, but are not limited to, hexane, heptane, THF (tetrahydrofuran), and ether.

Figure 2:
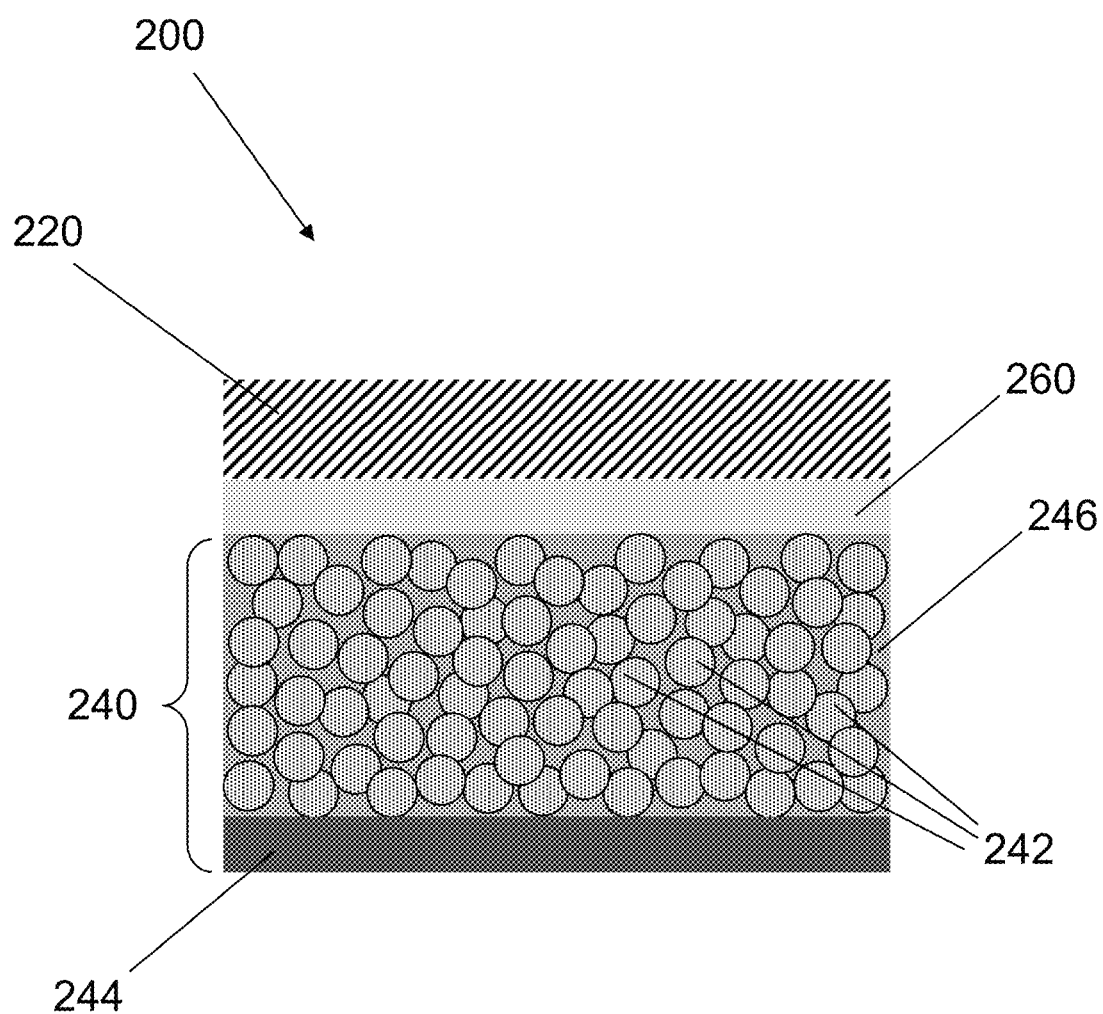
FIG. 2 is a schematic illustration of one configuration of a lithium battery cell, according to an embodiment of the invention.

Cell Designs that Include Lithium Foils that have Reduced Numbers of Lithium Hydride Surface Defects In another embodiment of the invention, a lithium battery cell 200 has a lithium foil anode 220 as shown in FIG. 2. The lithium battery cell 200 also has a cathode 240 that includes cathode active material particles 242, an electronically-conductive additive such as carbon black (not shown), a current collector 244, a catholyte 246, and an optional binder (not shown). There is a separator electrolyte 260 between the anode 220 and the cathode 240. The separator electrolyte 260 facilitates movement of lithium ions back and forth between the anode 220 and the cathode 240 as the cell 200 cycles. The separator electrolyte 260 may include any solid polymer electrolyte that is suitable for use in a lithium battery cell.

In some embodiments of the invention, the lithium foil anode 220 is made from a lithium foil that has been treated to remove LiH defects, as described herein. As they cycle, battery cells that have anodes made from such lithium foils do not develop disturbed regions in the electrolyte adjacent to the lithium foil, as described above in reference to FIG. 1.

A solid polymer electrolyte may also include electrolyte salt(s) that help to provide ionic conductivity. Examples of useful Li salts include, but are not limited to, $LiPF_6$, $LiN(CF_3SO_2)_2$, $Li(CF_3SO_2)_3C$, $LiN(SO_2CF_2CF_3)_2$, $LiB(C_2O_4)_2$, $Li_2B_{12}F_xH_{12-x}$, $Li_2B_{12}F_{12}$, $LiN(FSO_2)_2$, $LiN(CN)_2$, $LiB(CN)_4$ and mixtures thereof. Examples of such solid polymer electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more sulfur-based polyester electrolytes, as disclosed herein. The linear polymers can also be used in combination as graft copolymers with polysiloxanes, poly-alkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

The cathode active material particles 142 may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.

EXAMPLES

The following examples provide details relating to treatment of lithium foils to remove LiH defects and behavior of cells made with such foils in accordance with the present invention. It should be understood the following is representative only, and that the invention is not limited by the detail set forth in these examples.

Procedure for Lithium Foil Treatment with $B(Et)_3$

A lithium metal foil (1 $cm^2$) containing LiH faceted defects was dipped in 15 mL of 1M $B(Et)_3$ solution in THF (available from Sigma Aldrich) for 1 hour. The $LiBH(Et)_3$ complex that is formed is soluble in THF, leaving a clean/shiny lithium metal surface.

Impedance Growth Measurement

Lithium metal foils (1 $cm^2$) were treated with $B(Et)_3$ solution, as described above, and dried immediately under high vacuum. The foils were used to make lithium symmetric cells by hot pressing foils onto either side of a 20-micron-thick film of PEO-PS solid polymer electrolyte and then sealed in a pouch. Nickel tabs were used as current collectors for these cells. It was found that cells that contained lithium metal foils that had undergone treatment with borane have a lower fail-rate compared to cells that contain untreated lithium foils.

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A method, comprising the steps of:
providing a lithium foil that has a first surface wherein the first surface contains LiH defects;
placing the lithium foil in a solution of a trialkyl borane and a solvent for 0.25-4 hours, the trialkyl borane has a structure as follows:

wherein each R is selected independently from the group consisting of alkyl groups, perfluoroalkyl groups, alkoxy groups, and perfluoro alkoxy groups, and the perfluoroalkyl groups are selected from the group consisting of $CF_3$, $CF_2CF_3$, and combinations thereof;
removing the lithium foil from the solution; and
rinsing the lithium foil in a solvent.

2. The method of claim 1 wherein the alkyl groups are selected from the group consisting of methyl, ethyl, propyl, butyl, iso-propyl, tert-butyl, phenyl, cyclohexyl, allyl, and vinyl groups, and combinations thereof.

3. The method of claim 1 wherein at least one R is selected from the perfluoroalkyl groups.

4. The method of claim 1, wherein the solvent is selected from the group consisting of hexane, heptane, tetrahydrofuran (THF), and ether.

5. The method of claim 1 wherein the solvent is an inert organic solvent.

6. The method of claim 1 wherein the first surface includes a surface coverage of LiH defects of less than 1%.

7. The method of claim 1 wherein the solvent is tetrahydrofuran.

8. A method, comprising the steps of:
providing a lithium foil that has a first surface wherein the first surface contains LiH defects;
placing the lithium foil in a solution of a trialkyl borane and a solvent for 0.25-4 hours, the trialkyl borane has a structure as follows:

wherein each R is selected independently from the group consisting of alkyl groups, perfluoroalkyl groups, alkoxy groups, and perfluoro alkoxy groups, and the alkoxy groups are selected from the group consisting of methoxy, ethoxy, and isopropoxy groups, and combinations thereof;
removing the lithium foil from the solution; and
rinsing the lithium foil in a solvent.

9. The method of claim 8 wherein at least one R is selected from the alkoxy groups.

10. The method of claim 8 wherein the alkyl groups are selected from the group consisting of methyl, ethyl, propyl, butyl, iso-propyl, tert-butyl, phenyl, cyclohexyl, allyl, and vinyl groups, and combinations thereof.

11. The method of claim 8 wherein the solvent is an inert organic solvent.

12. The method of claim 8 wherein the solvent is selected from the group consisting of hexane, heptane, tetrahydrofuran (THF), and ether.

13. The method of claim 8 wherein the alkyl groups are selected from the group consisting of methyl, ethyl, propyl, butyl, iso-propyl, tert-butyl, phenyl, cyclohexyl, allyl, and vinyl groups, and combinations thereof.

14. The method of claim 8 wherein the first surface includes a surface coverage of LiH defects of less than 1%.

15. A method, comprising the steps of:
providing a lithium foil that has a first surface wherein the first surface contains LiH defects;
placing the lithium foil in a solution of a trialkyl borane and a solvent for 0.25-4 hours, the trialkyl borane has a structure as follows:

wherein each R is selected independently from the group consisting of alkyl groups, perfluoroalkyl groups, alkoxy groups, and perfluoro alkoxy groups, and the perfluoro alkoxy groups are selected from the group consisting of $CF_3O$—, $CF_2CF_3O$—, and combinations thereof;
removing the lithium foil from the solution; and
rinsing the lithium foil in a solvent.

16. The method of claim 15 wherein at least one R is selected from the perfluoro alkoxy groups.

17. The method of claim 15 wherein the solvent is an inert organic solvent.

18. The method of claim 15 wherein the solvent is selected from the group consisting of hexane, heptane, tetrahydrofuran (THF), and ether.

19. The method of claim 15 wherein the alkyl groups are selected from the group consisting of methyl, ethyl, propyl, butyl, iso-propyl, tert-butyl, phenyl, cyclohexyl, allyl, and vinyl groups, and combinations thereof.

20. The method of claim 15 wherein the first surface includes a surface coverage of LiH defects of less than 1%.

* * * * *